United States Patent [19]

Beausoleil

[11] 3,724,749

[45] Apr. 3, 1973

[54] KEY PUNCH FEATURE

[75] Inventor: William F. Beausoleil, Poughkeepsie, N.Y.

[73] Assignee: International Business Machines Corporation, Armonk, N.Y.

[22] Filed: Apr. 15, 1971

[21] Appl. No.: 134,252

[52] U.S. Cl. ....................................234/18, 234/125

[51] Int. Cl. ...............................................G06k 1/08

[58] Field of Search...........234/18, 19, 125, 123, 124

[56] References Cited

UNITED STATES PATENTS 3,627,197 12/1971 Stevens ................................234/18

*Primary Examiner*—J. M. Meister

*Attorney*—Hanifin & Jancin and Owen L. Lamb

[57] ABSTRACT

A high-speed column locate feature whereby a keypunch operator may select at random any predetermined column location on a unit record card and control the card punching to either automatically duplicate or skip at high speed to the selected column. A prepunched program card is provided in conjunction with auxiliary column-select keys. The program card has pre-punched coded patterns which are selectable by the column-select keys. By the appropriate choice of column-select keys and the wiring of the keys, a field definition is impressed upon keypunch field definition logic. When the SKIP or DUP control key is depressed, the card being fed automatically feeds the length of the field defined by the field impressed upon the field definition logic.

5 Claims, 2 Drawing Figures

Figure 1:
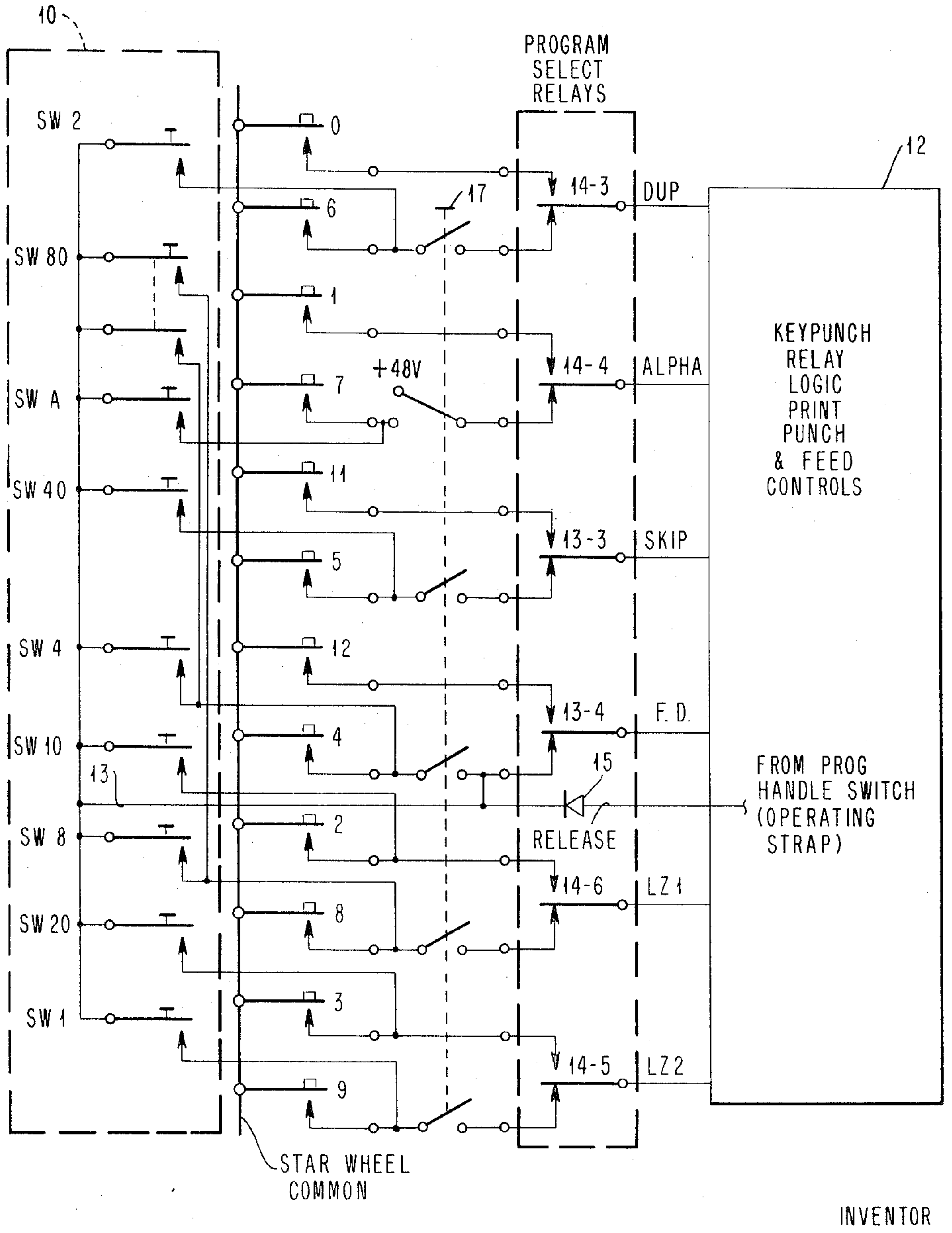

INVENTOR
WILLIAM F. BEAUSOLEIL

BY Owen Lamb
ATTORNEY

KEY PUNCH FEATURE

BACKGROUND OF THE INVENTION

This invention relates to the feeding of web material and more particularly to the control of the feeding of a unit record card to a printing or punching position under control of an operator keyboard.

At present, on keypunch apparatus such as the IBM 29 Card Punch, Models A, B and C, a high-speed skip feature is provided. This is a program controlled high-speed skip operating in conjunction with a program card and the skip key on the keyboard. High-speed skipping is accomplished at the rate of approximately two times the standard skip speed and results in a savings of 8 milliseconds per skipped column. This feature can be prepunched in program level 1 or program level 2 on a program card.

To use the high speed skip feature, an 11 punch on the program card initiates the skip, and a 1 punch controls the high-speed skipping. A 12 punch defines each column in the remainder of the field being skipped.

This skip feature does not allow skipping to any desired column under automatic control of the keyboard. It only allows skipping to a predetermined column under control of a fixed format punched on the program card. Therefore, if one wanted to skip to column 70, the program card must be prepunched as stated above with the field punched out to column 69 in the program card. If, during a subsequent keypunching operation, one desires to skip to a different field using the high-speed feature, a new program card must be inserted with the proper punching to cause skipping out to the column desired.

During keypunch operation, when an incorrect character is punched, the procedure for correcting the error is to punch a new card. This is performed by using the automatic duplicating function to duplicate the card up to, but not including, the column containing the error. This is accomplished by depressing the "-dup" key causing the new card to be duplicated up to either the point of the error or the beginning of the field containing the error. This requires that the "dup" key be held down until the column indicator reaches a position where the correction is to be made. If the keypunch operator overshoots this position, a new card has to be punched. Thus, the usual procedure is to release the "dup" key well in advance of the correct position and then single cycle the duplication up to the desired column. The card feeds at the relatively slow speed of 10 characters per second.

Card creation involves fixed fields of uniform characteristics. This process is carried out adequately by conventional keypunch operations including the indexing function performed by the field definitions on a program card. Modification of cards, on the other hand, usually involves variable fields which are actually subfields of the standard fixed fields used in card creation. For example, if an error is made while creating a card, the usual procedure is to duplicate the card up to the column in error and then resume punching the card as if the error had not occurred. This involves manually lifting the star wheels from the program drum, using the low-speed duplication function to copy the correct data onto a new card, manually restoring the star wheels, and manually shifting the first character to be punched on resuming the creation process. This procedure is slow because of the required manual operations and also because the duplication function occurs at a slow speed. Many times the operation is aborted and must be repeated because the operator duplicates the card beyond the point in error.

It is an object of this invention to provide a low cost means of simplifying unit record card modification on a keypunch.

It is also an object of this invention to provide a high-speed duplication function which allows a keypunch operator to duplicate a unit record card up to any preselected column without the need for visually checking the position of the card.

It is a further object of this invention to provide a high-speed skip and duplication function which utilizes only one program area of a two-program program card.

It is a further object to provide a means whereby a key-punch operator may select at random any predetermined column location on a unit record card and control the card punching to either automatically duplicate or skip at card release speeds to the selected column.

The above objects are accomplished in accordance with the invention by providing a prepunched program card for use in conjunction with a column-select auxiliary keyboard. The program card has pre-punched coded patterns which are selectable by the auxiliary keyboard keys. By the appropriate choice of keys and the wiring of the keyboard, a field definition is impressed upon the keypunch field definition logic such that when the skip or dup key is depressed, the card being fed automatically feeds the length of the field defined by the field impressed upon the field definition logic.

The high speed duplication function has the advantage of greatly improving the card modification process by providing a fast skip/dup function.

The invention has the advantage of ease of skipping because the operator does not have to repeatedly depress the space key.

The invention has the further advantage that the operator does not have to visually follow the program card drum until a particular location is reached.

The invention has the further advantage of flexibility. The operator does not have to change program control cards in order to change the fields to be skipped or duplicated.

The foregoing and other objects, features and advantages of the invention will be apparent from the following more particular description of a preferred embodiment of the invention as illustrated in the accompanying drawings.

Figure 2:
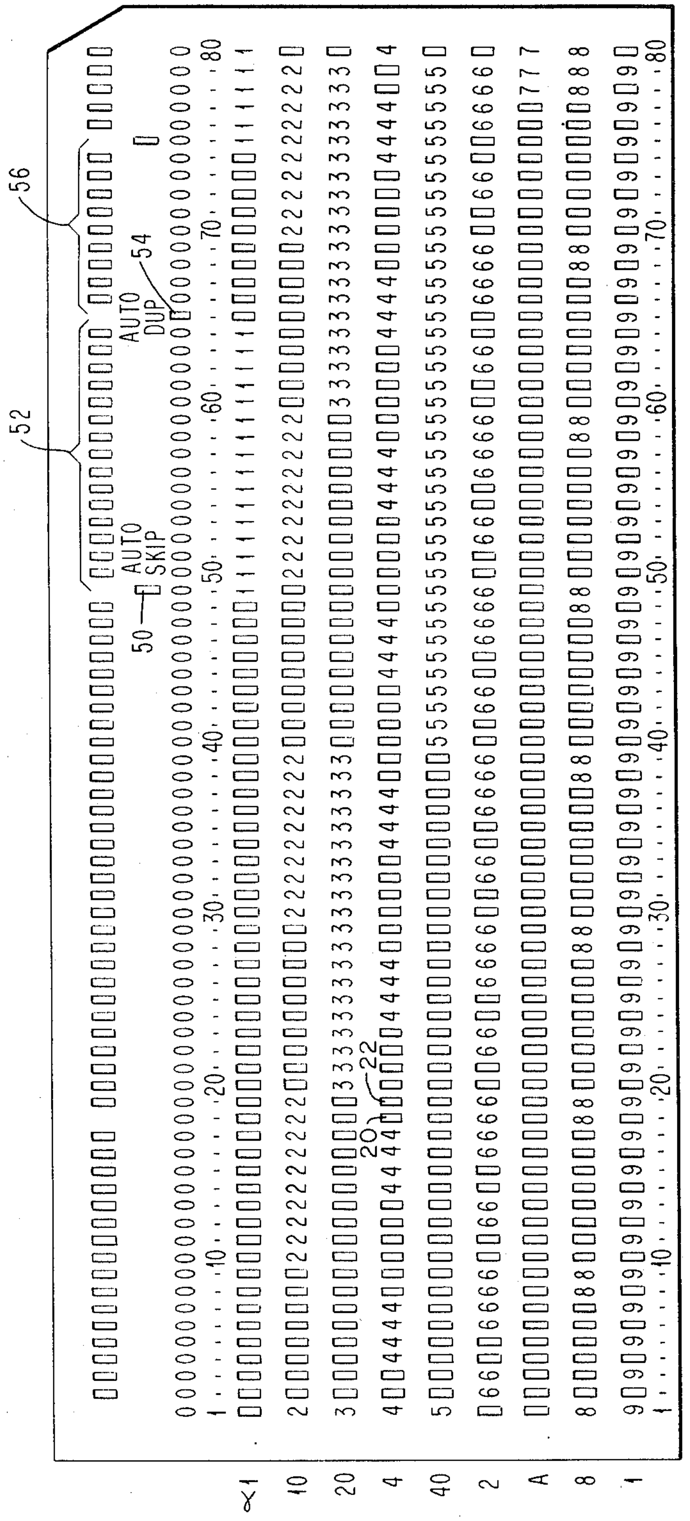

FIG. 1 is a schematic diagram of the high-speed skip/duplication feature wired into a standard IBM 029 keypunch; and FIG. 2 is a diagram of a prepunched unit record card for use on the program drum to provide the high-speed skip/duplication function.

Referring now to FIG. 1, a high-speed skip/dup column-select switch unit 10 is shown connected to the star wheel terminal block of an IBM 029 card punch. Part of the relay logic is shown in FIG. 1 and the remainder is illustrated by a logic block 12 which includes the keypunch relay logic print, punch and feed control for the IBM 029 card punch. The logic is more fully described in IBM Reference Manual IBM 29 Card Punch, Form No. A24-332-2 and in the systems diagrams Engineering Specification No. 895,291, copies of which may be obtained at an IBM branch office.

A program card (FIG. 2) is prepared for each different punching application and can be used repeatedly. Proper punching in the program card controls the automatic operation for the corresponding columns of the cards being punched. Each row of the program card governs a specific function. A program select switch is provided on the keyboard to select the program level in which the machine will operate for each card being punched. The program level set by the switch can also be altered by the use of the program keys 1 and 2 on the keyboard. If a program key is pressed, the program level is shifted to the corresponding program level if it is not already selected to that level by the switch. The program level selected by the key is held for the duration of the card or until another program key is depressed. In the card shown in FIG. 2, program level 1 is the upper one-half of the card and program level 2 is the lower one-half of the card. In FIG. 1, the program select relay contacts 13-3 through 14-5 are shown set to program level 2.

FIELD DEFINITION COLUMNS 12, 4

A 12 punch is the field definition punch for program level number 1 and a 4 punch is the field definition punch for program level number 2. In the normal operation of the IBM 029 Keypunch, a field definition punch for the program level being used must appear in every column except the first left-hand position of every field to be automatically skipped, duplicated, or manually punched. The field definition punch causes the operation to continue to the end of the field for any skip or duplication that is started within a defined field.

Field definition codes punched in the program card for manually punched fields permit skipping or duplicating initiated from the keyboard by depressing the skip or the dup key.

Automatic skipping or duplicating can be programmed on the program card. An 11 punch is the auto-start code for skipping in program level 1 and a 5 punch is the auto-start code for skipping in program level number 2. For example, in program level 1, an automatic skip is started by punching a start auto skip code 50 in the 11 punch row in the first column of the field to be skipped. The skip continues for each column after the start is initiated for all columns 52 having a field definition punched in the 12 punch row. If the auto skip, auto dup key on the keyboard is in the off position, the program card codes are not operative for these two automatic operations.

The zero punch is the start automatic duplication code for program level number 1 and a 6 punch is the start automatic duplication code for program level number 2. As with the automatic skip operation, an automatic duplication is started by punching a start auto duplication code punch 54 for the program level being used in the first column of the field to be duplicated. The duplication continues for all columns 56 following the initial starting column that is defined by a field definition punch.

A one punch is the alphabetic shift ($\alpha 1$) control for program level number 1 and a 7 punch is the alphabetic shift ($\alpha 2$) control for program level number 2 . When a program card is in the machine, the keyboard is normally in numeric mode or shift. Therefore, to punch any alphabetic characters or special characters that are part of the alphabetic shift, the punch must be shifted to the correct mode. This shifting is performed by punching the alphabetic shift code for the program level being used into the columns of the program card that correspond to the columns of the card requiring the change to alphabetic shift. The shift of the keyboard is effective only for the columns that have alphabetic shift program codes punched into the program card. For example, in program 1, the card shown in FIG. 2 has alphabetic shift coded into columns 1–48 and 65–74.

In order to prepare the program card of FIG. 2 for use with the high-speed/duplication feature of the present invention, it is necessary to have holes punched in program level 2 of the card as shown in FIG. 2. Program level number 1 is available for use by the operator in the normal manner. For example, in program 1, fields are defined as follows: columns 1–17, 18–48, 49–64, 65–74, and 75–80. Examples of auto-skip are shown in columns 49 and 75, auto-dup in column 65. Alphabetic shift is shown for columns 1–48 and 65–74.

The alphabetic shift punch 7 (program level 2) is used for a variable column select described below.

The remaining columns punched in the card are punched in a manner which provides various combinations of rows to be selected to produce any field definition length from 1 through 80. The rows labeled 1, 2, 4, 8, 10, 20, 40 correspond to respective column select keys 10 shown in FIG. 1.

Referring to FIG. 1, the high-speed column select mode of operation is selected by throwing mode switch 17 to the position shown. The mode switch opens connections between the star wheel contacts 0 – 9, 11 and 12 and the relay logic. +48 volts is impressed upon the alpha relay logic to insure that both alphabetic and numeric characters are punched during any high-speed column select operation.

Column select keys 10 (SW2, SW4, etc.) are wired to the star wheel contacts. The keys are commoned together and connected via switch common 13 to the field definition (F.D.) relay logic. Thus, when one of the column select keys 10 is depressed, the field definition signal produced upon reading the program card (the field being impressed via switch common 13 upon the field definition contact 4) produces the appropriate field definition to cause skipping or duplicating out to the column selected. In FIG. 1, the relays are shown set to program level 2. Therefore, the field definition signal passes through relay contact 13-4 to the relay logic 12. The logic responds as it would to a normally programmed field definition.

For a skip to column 2, depression of switch 2 causes the 6-punch to be impressed upon the field definition 13. The signal passes through relay contact 13-4 (the machine is in program level 2), and is impressed upon the logic 12 to cause the feed controls to skip or duplicate out to the column 2.

Skipping to column 4 is accomplished by depressing switch 4 which impresses the field punch in row 4 upon the field definition contact. A skip or dup out to column 5 is accomplished by pressing switches 4 and 1 simultaneously; the additive effect of the 4-punch and 9-punch giving an effective field definition punch out to column 5. A skip to column 8 is controlled by the punches in row 8, a skip to column 10 is controlled by punches in row 2, a skip to column 20 by the punches in row 3, a skip to column 40 is controlled by punches in row 5. Any combination of skipping to a column is accomplished by depressing the appropriate switches, the sum of which equals the column desired.

In order to avoid having to punch another row, thereby leaving program level 1 unavailable for use by the keypunch operator, skipping to column 80 is accomplished by a ganged switch SW80 which, when depressed, combines the outputs of column 8 and column 4 to provide a continuous field definition punch, i.e., out to column 80. This is accomplished by providing additional punches 20, 22 in row 4 which, when combined with the punches in column 8, provide a continuous field definition punch but which have no effect when row 4 is used in other combinations. By utilizing this technique of providing the 80 column field definition by combining the 8 and 4 rows, it is not necessary to utilize the only remaining available rows, i.e., the program 1 fields.

Furthermore, the $\alpha$2 shift function is obtained by wiring +48 volts to star wheel contact 7, thus freeing row 7 for the variable column select described below.

RELEASE

The release is used to advance the card in the read or punch station through column 80. If the machine is under program control and the release operation encounters an auto-dup field, the auto-dup information is punched before the release operation can continue. Thus, when a card is released because of a keying error, the common information is not lost.

When the keypunch is operating under control of program 2 in accordance with the present invention, a high-speed release is provided. This is accomplished by means of a diode 15 which causes +48 volts to be impressed on the field-definition (F.D.) whenever the release key is depressed. This causes the skip relay (not shown in FIG. 1 — see above identified systems diagrams) to pick. The card then feeds at skip speeds through column 80.

SKIP/DUP VARIABLE COLUMN SELECT

An additional switch SW A is shown connected to row 7. This enables an operator to skip/dup any field length from 1 to 80 by depressing the column select key SW A. Since the field 7 is variable, any column can be prepunched on the card. In FIG. 2, for example, a field for column select to column 78 has been illustrated. This is convenient in applications where skipping to a particular column is always performed.

One does not program a single column field with a field definition punch. Therefore, a punch does not occur in the first column of row 9 corresponding to switch position 1.

The invention has been described with respect to a keypunch apparatus in which cards are fed past a punch station. It should, however, be understood that the invention may be practiced with respect to any web feeding apparatus.

SUMMARY

A skipping or duplicating function is started by depressing the SKIP or DUP keyboard control key. The SKIP or DUP continues for each column after the start is initiated for all columns having a field definition punch. A program control card is prepared with rows of the card punched in a coded format such that when selection switches are depressed, punches from different rows on the card are added together. The cumulative effect depends upon which keys are depressed and result in a field definition punch of variable length selectable by a combination of the select keys.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a web feeding apparatus in which feeding functions are initiated by keyboard-function keys, and in which said feeding functions are extended over a plurality of feeding increments comprising field definition controls under control of a field definition code on a program drum card operating in synchronism with the feeding of said web, and wherein the length of said field is variable depending upon the number of increments over which said feeding is to extend, the improvement comprising:

a plurality of subsets of the maximum length of said field coded on said program drum card;

manual selection means for selecting one or more of said subsets;

means for combining the subsets selected to thereby produce a continuous field definition extent manifestation; and means for electrically impressing said extent manifestation onto said field definition controls, whereupon depressing a function key said function is extended over said field defined by said continuous field definition extent manifestation.

2. A variable indexing means for a web feeding device comprising:

a program card having prepunched thereon fixed format fields;

switching means for switchably combining said fixed format fields to provide a continuous field definition; and means for impressing said field definition upon feeding controls to thereby result in a manually variable format field which variable format field controls the extent of a function initiated by a manually operable function key.

3. In a keypunch apparatus in which a skipping or duplicating function is started by depressing a SKIP or DUP keyboard key, and in which said skipping or duplicating function continues for all columns having a field definition punch in a field definition row of a program card under control of logic which responds to the reading of said field definition punch, the improvement comprising:

a program control card having a plurality of rows punched in a coded format, means for reading rows of said program card;

switch means connected to said reading means operable to select one or more combinations of said rows; and means connecting said switch means to said logic such that punches read from the selected rows are added together, whereby the cumulative effect results in a field definition of variable length selectable by said switch means.

4. A variable indexing means for a web feeding device comprising:

a program card having prepunched thereon a field;

switching means for switchably selecting said field to provide a field definition; and means for impressing said field definition upon feeding controls to thereby result in a manually selectable field which field controls the extent of a function initiated by a manually operable function key.

5. In a keypunch apparatus in which a skipping or duplicating function is started by depressing a SKIP or DUP keyboard key, and in which said skipping or duplicating function continues for all columns having a field definition punch in a field definition row of a program card under control of logic which responds to the reading of said field definition punch, the improvement comprising:

a program control card having at least one row punched in a predetermined format, means for reading said row of said program card;

switch means connected to said reading means operable to select said row; and means connecting said switch means to said logic such that punches read from the selected row result in a field definition of predetermined length selectable by said switch means.

* * * * *